United States Patent Office 3,632,503
Patented Jan. 4, 1972

3,632,503
CATALYTIC COMPOSITE OF PLATINUM, TIN AND GERMANIUM WITH CARRIER MATERIAL AND REFORMING THEREWITH
John C. Hayes, Palatine, Ill., assignor to Universal Oil Products Company, Des Plaines, Ill.
No Drawing. Filed Sept. 10, 1969, Ser. No. 856,810
Int. Cl. C10g 35/08; B01j 11/08
U.S. Cl. 208—139
19 Claims

ABSTRACT OF THE DISCLOSURE

A catalytic composite comprising a combination of catalytically effective amounts of a platinum group component, a tin component and a germanium component with a porous carrier material is disclosed. The principal utility of this composite is in the conversion of hydrocarbons, particularly in the reforming of a gasoline fraction. A specific example of the disclosed catalytic composite is a combination of catalytically effective amounts of a platinum component, a tin component, a germanium component and a halogen component with an alumina carrier material.

DISCLOSURE

The subject of the present invention is a novel catalytic composite which has exceptional activity and resistance to deactivation when employed in a hydrocarbon conversion process that requires a catalyst having both a hydrogenation-dehydrogenation function and a cracking function. More precisely, the present invention involves a novel dual-function catalytic composite which, quite surprisingly, enables substantial improvements in hydrocarbon conversion processes that have traditionally used a dual-function catalyst. In another aspect, the present invention comprehends the improved processes that are produced by the use of a catalytic composite comprising a combination of a platinum group component, a tin component and a germanium component with a porous carrier material; specifically, an improved reforming process which utilizes the subject catalyst to improve activity, selectivity and stability characteristics.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalyst of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield that is obtained at the particular severity level; and stability is typically equated to the rate of change with time of activity, as measured by octane number of $C_5+$ product and of selectivity, as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity and stability. In particular, for a reforming process the problem is typically expressed in terms of shifting and stabilizing the $C_5+$ yield-octane relationship—$C_5+$ yield being representative of selectivity and octane being proportional to activity.

I have now found a dual-function catalytic composite which possesses improved activity, selectivity, and stability when it is employed in a process for the conversion of hydrocarbons of the type which have heretofore utilized dual function catalytic composites such as processes for isomerization, hydroisomerization, dehydrogenation, desulfurization, denitrogenization, hydrogenation, alkylation, dealkylation, hydrodealkylation, transalkylation, cyclization, dehydrocyclization, cracking, hydrocracking, reforming, and the like processes. In particular, I have ascertained that a combination of catalytically effective amounts of a platinum group metallic component, a tin component and a germanium component with a porous refractory carrier material enables the performance of hydrocarbon conversion processes utilizing dual-function catalysts to be substantially improved. Moreover, I have determined that a catalytic composite comprising a combination of catalytically effective amounts of a platinum component, a germanium component, a tin component and a halogen component with an alumina carrier material can be utilized to substantially improve the performance of a reforming process which operates on a gasoline fraction to produce a high-octane reformate. In the case of a reforming process, the principal advantage associated with the use of the novel catalyst of the present invention involves the acquisition of the capability to operate in a stable manner in a high severity operation; for example, a low pressure reforming process designed to produce a $C_5+$ reformate having an octane of about 100 F-1 clear. As indicated, the present invention essentially involves the finding that the addition of a germanium component and a tin component to a dual-function hydrocarbon conversion catalyst containing a platinum group component enables the performance characteristics of the catalyst to be sharply and materially improved.

It is, accordingly, one object of the present invention to provide a hydrocarbon conversion catalyst having superior performance characteristics when utilized in a hydrocarbon conversion process. A second object is to provide a catalyst having dual-function hydrocarbon conversion performance characteristics that are relatively insensitive to the deposition of hydrocarbonaceous material thereon. A third object is to provide preferred methods of preparation of this catalytic composite which insures the achievement and maintenance of its properties. Another object is to provide an improved reforming catalyst having superior activity, selectivity and stability. Yet another object is to provide a dual-function hydrocarbon conversion catalyst which utilizes a combination of relatively inexpensive components, germanium and tin, to promote a platinum metal component.

In brief summary, the present invention is, in one embodiment, a catalytic composite comprising a combination of catalytically effective amounts of a platinum group component, a tin component and a germanium component with a porous carrier material. The porous carrier material is typically a porous, refractory material such as a refractory inorganic oxide and the germanium component, the tin component and the platinum metallic component are usually utilized in relatively small amounts which are effective to promote the desired hydrocarbon conversion reaction.

A second embodiment relates to a catalytic composite comprising a combination of catalytically effective amounts of a platinum component, a tin component, a germanium component and a halogen component with an alumina carrier material. These components are preferably present in the composite in amounts sufficient to result in the final composite containing, on an elemental basis, about 0.1 to about 3.5 wt. percent halogen, about 0.01 to about 2 wt. percent platinum, about 0.01 to about 5 wt. percent tin, and about 0.01 to about 5 wt. percent germanium.

Another embodiment relates to a process for the conversion of a hydrocarbon comprising contacting the hydrocarbon and hydrogen with the catalytic composite described above in the first embodiment at hydrocarbon conversion conditions.

One preferred embodiment relates to a process for reforming a gasoline fraction which comprises contacting the gasoline fraction and hydrogen with the catalytic composite described above in the second embodiment at reforming conditions selected to produce a high-octane reformate.

Other objects and embodiments of the present invention relate to additional details regarding preferred catalytic ingredients, concentration of components in the catalytic composite, suitable methods of composite preparation, operating conditions for use in the hydrocarbon conversion processes and the like particulars which are hereinafter given in the following detailed discussion of each of these facets of the present invention.

As indicated above, the catalyst of the present invention comprises a porous carrier material or support having combined therewith catalytically effective amounts of a platinum group component, a tin component, a germanium component and in the preferred case a halogen component. Considering first the porous carrier material utilized in the present invention, it is preferred that the material be a porous, adsorptive, high-surface area support having a surface area of about 25 to about 500 m.$^2$/gm. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke or charcoal; (2) silica or silica gel, silicon carbide, clays and silicates including those synthetically prepared and naturally occurring, which may or may not be acid treated, for example, Attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and (6) combinations of one or more elements from each of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma-alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 gm./cc. and surface area characteristics such that the average pore diameter is about 20 to 300 angstroms, the pore volume is about 0.1 to about 1 ml./gm. and the surface area is about 100 to about 500 m.$^2$/gm. In general, best results are typically obtained with a gamma-alumina carrier material which is used in the form of spherical particles having: a relatively small diameter (i.e. typically about $\frac{1}{16}$ inch), an apparent bulk density of about 0.5 gm./cc., a pore volume of about 0.4 ml./gm., and a surface area of about 175 m.$^2$/gm.

The preferred alumina carrier material may be prepared in any suitable manner and may be synthetically prepared or naturally occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Patent No. 2,620,314 for additional details regarding this oil drop method.

One essential constituent of the catalyst of the present invention is a germanium component. This component may be present as an elemental metal or as a chemical compound such as the oxide, sulfide, halide, oxychloride, aluminate, etc. Although it is not intended to restrict the present invention by this explanation, it is believed that best results are obtained when the germanium component is present in the composite in an oxidation state above that of the elemental metal with the +4 oxidation state being preferred. Preferably, the germanium component is used in an amount sufficient to result in the final catalytic composite containing, on an elemental basis, about 0.01 to about 5 wt. percent germanium, with best results typically obtained with about 0.05 to about 2 wt. percent germanium. This germanium component may be incorporated in the catalytic composite in any suitable manner known to the art such as by coprecipitation or cogellation with the porous carrier material, ion-exchange with the gelled carrier material, or impregnation with the carrier material either after or before it is dried and calcined. It is to be noted that it is intended to include within the scope of the present invention all conventional methods for incorporating a metallic component in a catalytic composite and the particular method of incorporation used is not deemed to be an essential feature of the present invention. One method of incorporating the germanium component into the catalytic composite involves coprecipitating the germanium component during the preparation of the preferred carrier material, alumina. This method typically involves the addition of a suitable soluble germanium compound such as germanium tetrachloride to the alumina hydrosol and then combining the hydrosol with a suitable gelling agent and dropping the resulting mixture into an oil bath, etc., as explained in detail hereinbefore. After drying and calcining the resulting gelled carrier material there is obtained an intimate combination of alumina and germanium oxide. A preferred method of incorporating the germanium component into the catalytic composite involves utilization of a soluble, decomposable compound of germanium to impregnate the porous carrier material. In general, the solvent used in this impregnation step is selected on the basis of the capability to dissolve the desired germanium compound and is preferably an aqueous, acidic solution. Thus, the germanium component may be added to the carrier material by commingling the latter with an aqueous, acidic solution of suitable germanium salt or suitable compound of germanium such as germanium tetrachloride, germanium difluoride, germanium tetrafluoride, germanium di-iodide, germanium monosulfide and the like compounds. One particularly preferred impregnation solution comprises nascent germanium metal dissolved in chlorine water to yield germanium monoxide. A second preferred impregnation solution comprises germanium tetrachloride dissolved in ethanol. In general, the germanium component can be impregnated either prior to, simultaneously with, or after the other metallic components are added to the carrier material. However, I have found excellent results when the germanium component is impregnated simultaneously with the other metallic components. In fact, I have determined that a preferred impregnation solution contains chloroplatinic acid, hydrogen chloride, stannic chloride and germanium tetrachloride dissolved in ethanol. Following the incorporation of this component, the resulting composite is usually dried and calcined as explained hereinafter.

Regardless of which germanium compound is used in the preferred impregnation step, it is important that the germanium component be uniformly distributed throughout the carrier material. In order to achieve this objective it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about ¼ hour up to about ½ hour or more before drying to remove excess solvent in order to insure a high dispersion of the germanium component on the carrier material. The mixture of impregnation solution and carrier material is, likewise, preferably constantly agitated during this preferred impregnation step.

As indicated above, a second essential constituent of the subject catalyst is the platinum group component. Although the process of the present invention is specifically directed to the use of a catalytic composite containing platinum, it is intended to include other platinum group metals such as palladium, rhodium, ruthenium, osmium and iridium. The platinum group component such as platinum may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum or a compound of platinum.

The platinum group component may be incorporated in the catalytic composite in any suitable manner such as coprecipitation or cogellation with the preferred carrier material, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium chloride dihydrate, palladium nitrate, etc. The utilization of a platinum chloride compound, such as chloroplatinic acid, is preferred since it facilitates the incorporation of both the platinum component and at least a minor quantity of the preferred halogen component in a single step. Hydrogen chloride is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases it may be advantageous to impregnate the carrier material when it is in a gelled state. Following the incorporation of this component, the resulting composite is typically dried and subjected to a high temperature calcination or oxidation technique which is explained hereinafter.

Yet another essential ingredient of the catalyst of the present invention is the tin component. This component may be present as an elemental metal, as a chemical compound such as the oxide, sulfide, halide, oxychloride, etc., or as a physical or chemical combination with the porous carrier material and/or other components of the catalytic composite. The tin component is preferably utilized in an amount sufficient to result in a final catalytic composite containing about 0.01 to about 5 wt. percent tin, calculated on an elemental basis, with best results obtained at a level of about 0.1 to about 1 wt. percent. The tin component may be incorporated in the catalytic composite in any suitable manner such as by coprecipitation or cogellation with the porous carrier material, ion-exchange with the carrier material or impregnation of the carrier material at any stage in the preparation. It is to be noted that it is intended to include within the scope of the present invention all conventional methods for incorporating a metallic component in a catalytic composite, and the particular method of incorporation used is not determined to be an essential feature of the present invention. One preferred method of incorporating the tin component into the catalytic composite involves coprecipitating the tin component during the preparation of the preferred refractory oxide carrier material. In the preferred case, this involves the addition of suitable soluble tin compounds such as stannous or stannic halide to the alumina hydrosol, and then combining the hydrosol with a suitable gelling agent and dropping the resulting mixture into an oil bath, etc., as explained in detail hereinbefore. Following the calcination step, there is obtained a carrier material comprising an intimate combination of alumina and stannic oxide. Another preferred method of incorporating the tin component into the catalyst composite involves the utilization of a soluble, decomposable compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride is particularly preferred since it facilitates the incorporation of both the tin component and at least a minor amount of the preferred halogen component in a single step. In general, the tin component can be impregnated either prior to, simultaneously with, or after the platinum group and/or germanium components are added to the carrier material. However, I have found that excellent results are obtained when the tin component is impregnated simultaneously with the platinum group and germanium components. In fact, I have determined that a preferred impregnation solution contains chloroplatinic acid, hydrogen chloride, stannous or stannic chloride, and germanium tetrachloride dissolved in ethanol. Following the incorporation of this component, the resulting composite is typically dried and calcined as explained hereinafter.

Additionally, it is generally preferred to incorporate a halogen component into the catalytic composite of the present invention. Accordingly, a preferred embodiment of the present invention involves a catalytic composite comprising a combination of catalytically effective amounts of a platinum group metallic component, a germanium component, a tin component and a halogen component with an alumina carrier material. Although the precise form of the chemistry of the association of the halogen component with the carrier material is not entirely known, it is customary in the art to refer to the halogen component as being combined with the carrier material or with the other ingredients of the catalyst. This combined halogen may be either fluorine, chloride, iodine, bromine, or mixtures thereof. Of these, fluorine and particularly chlorine are preferred. The halogen may be added to the carrier material in any suitable manner either during prepaation of the carrier material or before or after the addition of the other components. For example, the halogen may be added at any stage of the preparation of the carrier material or to the calcined carrier material as an aqueous solution of na acid such as hydogen fluoride, hydrogen chloride, hydrogen bromide, etc. The halogen component or a portion thereof may be composited with the carrier material during the impregnation of the latter with the platinum group component; for example, through aqueous solution of an acid such as hydrogen fluoride, hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. percent and preferably about 0.5 to about 1.5 wt. percent of halogen calculated on an elemental basis. In isomerization or hydrocracking embodiments, it is generally preferred to utilize relatively larger amounts of halogen in the catalyst—typically ranging up to about 10 wt. percent halogen calculated on an elemental basis and more preferably about 1 to about 5 wt. percent.

Regarding the preferred amounts of the various metallic components of the subject catalyst, I have found it to be a good practice to specify the amounts of the tin component and of the germanium component as a function of the amount of the platinum group component. On this basis, the amount of the tin component is ordinarily selected so that the atomic ratio of tin to the platinum group metal contained in the composite is about 0.2:1 to about 3:1. Similarly, the amount of the germanium component is ordinarily selected to porduce a composite containing an atomic ratio of germanium to platinum group metal of about 0.25:1 to about 6:1.

Another significant parameter for the subject catalyst is the "total metals content" which is defined to be the sum of the platinum group component, the tin component and the germanium component, calculated on an elemental germanium, tin and platinum group metal basis. Good results are ordinarily obtained with the subject catalyst when this parameter is fixed at a value of about 0.15 to about 4 wt. percent, with best results ordinarily achieved at a metals loading of about 0.3 to about 2 wt. percent.

Integrating the above discussion of each of the essential and preferred components of the catalytic composite, it is evident that a particularly preferred catalytic composite comprises a combination of a platinum component, a tin component, a germanium component and a halogen componet with a alumina carrier material in amounts sufficient to result in the composite containing about 0.5 to about 1.5 wt. percent halogen, about 0.05 to about 1 wt. percent platinum, about 0.1 to about 1 wt. percent tin and about 0.05 to about 2 wt. percent germanium. Accordingly, specific examples of especially preferred catalytic composites are as follows: (1) a catalytic composite comprising a combination of 0.25 wt. percent germanium, 0.25 wt. percent tin, 0.75 wt. percent platinum, and about 0.5 to about 1.5 wt. percent halogen with an alumina carrier material; (2) a catalytic composite comprising a combination of 0.2 wt. percent germanium, 0.3 wt. percent tin, 0.375 wt. percent platinum and about 0.5 to about 1.5 wt. percent halogen with an alumina carrier material; (3) a catalytic composite comprising a combination of about 0.3 wt. percent germanium, 0.2 wt. percent tin, 0.375 wt. percent platinum, and about 0.5 to about 1.5 wt. percent halogen with an alumina carrier material; (4) a catalytic composite comprising a combination of 0.2 wt. percent germanium, 0.5 wt. percent tin, 0.5 wt. percent platinum, and about .5 to about 1.5 wt. percent halogen with an alumina carrier material; (5) a catalytic composite comprising a combination of 0.5 wt. percent germanium, 0.25 wt. percent platinum, 0.5 wt. percent tin and about 0.5 to about 1.5 wt. percent halogen with an alumina carrier material; and, (6) a catalytic composite comprising a combination of 0.1 wt. percent germanium, 0.1 wt. percent tin, 0.375 wt. percent platinum and about 0.5 to about 1.5 wt. percent halogen with an alumina carrier material. The amounts of the components reported in these examples are, of course, calculated on an elemental basis.

Regardless of the details of how the components of the catalyst are combined with the porous carrier material, the final catalyst generally will be dried at a temperature of about 200 to about 600° F. for a period of from about 2 to about 24 hours or more and finally calcined at a temperature of about 700° F. to about 1100° F. in an air atomsphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

Although it is not essential, it is preferred that the resultant calcined catalytic composite be subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e. less than 20 vol. p.p.m. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce the platinum component to its elemental state while maintaining the germanium component in a positive oxidation state. This reduction treatment may be performed in situ as part of a start-up sequence if precautions are taken to pre-dry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more. It is generally a good practice to perform this presulfiding step under substantially water-free conditions.

According to the present invention, a hydrocarbon charge stock and hydrogen are contacted with a catalyst of the type described above in a hydrocarbon conversion zone. This contacting may be accomplished by using the catalyst in a fixed bed system, a moving bed system, a fluidized bed system or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst with best results obtained in the vapor phase.

In the case where the catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics may also be present. This preferred class include straight run gasolines, natural gasolines, synthetic gasoline and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling the range of $C_7$ to 400° F. In some cases, it is also advantageous to charge pure hydrocarbons or mixtures of hydrocarbons that have been extracted from hydrocarbon distillates—for example, straight chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins or a normal butane-rich stock or an n-hexane-rich stock or a mixture of xylene isomers, etc. In hydrocracking embodiments the charge stock will be typically a gas oil, heavy cracked cycle oil, etc. In addition, alkylaromatic and naphthenes can be conveniently isomerized by using the catalyst of the present invention. Likewise, pure hydrocarbons or substantially pure hydrocarbons can be converted to more valuable products by using the catalyst of the present invention in any of the hydrocarbon conversion processes known to the art that use a dual-function catalyst.

In a reforming embodiment it is generally preferred that the novel catalytic composite is utilized in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 p.p.m. and preferably less than 20 p.p.m., expressed as weight of equivalent water in the charge stock. In general, this can be accomplished by careful control of the water present in the charge stock and in the hydrogen stream; the charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 p.p.m. of $H_2O$ equivalent. In general, it is preferred to dry the hydrogen stream entering the hydrocarbon conversion zone down to a level of about 10 vol. p.p.m. of water or less. This can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25 to 150° F., wherein a hydrogen-rich gas is separated from a high octane liquid product, commonly called an unstabilized reformate. Preferably, at least a portion of this hydrogen-rich gas is withdrawn from the separating zone and passed through an adsorption zone containing an adsorbent selective for water. The resultant substantially water-free hydrogen stream is then recycled through suitable compressing means back to the reforming zone. The liquid phase from the separating zone is then typically withdrawn and commonly treated in a fractionating system in order to adjust the butane concentration, thereby controlling front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° F. to about 1000° F. and preferably about 75° to about 600° F.; a pressure of atmospheric to about 100 atmospheres; a hydrogen to hydrocarbon mole ratio of about 0.5:1 to about 20:1, and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$ Dehydrogenation conditions include: a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 p.s.i.g. to about 3000 p.s.i.g.; a temperature of about 400° F. to about 900° F.; a LHSV of about 0.1 hr.$^{-1}$ to about 10 hr.$^{-1}$; and hydrogen circulation rates of about 1000 to 10,000 s.c.f. per barrel of charge.

In the reforming embodiment of the present invention the pressure utilized is selected from the range of about 0 p.s.i.g. to about 1000 p.s.i.g., with the preferred pressure being about 50 p.s.i.g. to about 350 p.s.i.g. Particularly good results are obtained at low pressure; namely, a pressure of about 75 to 200 p.s.i.g. In fact, it is a singular advantage of the present invention that it allows stable operation at lower pressures than have heretofore been successfully utilized in so-called "continuous" reforming systems (i.e. reforming for periods of about 15 to about 200 or more barrels of charge per pound of catalyst without regeneration). In other words, the catalyst of the present invention allows the operation of a continuous reforming system to be conducted at lower pressure (i.e. 50 to about 350 p.s.i.g.) for about the same or better catalyst life before regeneration as has been heretofore realized with conventional catalysts at higher pressures (i.e. 400 to 600 p.s.i.g.). On the other hand, the stability feature of the present invention enables reforming operations conducted at pressures of 400 to 600 p.s.i.g. to achieve substantially increased catalyst life before regeneration.

Similarly, the temperature required for reforming is generally lower than that required for a similar reforming operation using a high quality catalyst of the prior art. This significant and desirable feature of the present invention is a consequence of the selectivity of the catalyst of the present invention for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the intial election of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product is substantially lower for the catalyst of the present invention than for the high quality reforming catalyst which is manufactured in exactly the same manner as the catalyst of the present invention except for the inclusion of the germanium and tin components. Moreover, for the catalyst of the present invention, the $C_5+$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$ with a value in the range of about 1 to about 5 hr.$^{-1}$ being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following examples are given to illustrate further the preparation of the catalytic composite of the present invention and the use thereof in the conversion of hydrocarbons. It is understood that the examples are given for the sole purpose of illustrating the utility, mode of operation and some of the advantages associated with the catalytic composition of the present invention.

Example I

This example demonstrates a preferred method of preparing the preferred catalytic composite of the present invention.

An alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 wt. percent combined chloride. Additional details as to this method of preparing the preferred carrier material are given in the teachings of U.S. Patent No. 2,620,314.

A measured amount of germanium tetrachloride was dissolved in ethanol. An aqueous solution containing chloroplatinic acid, stannic chloride and hydrogen chloride was then prepared. The two solutions were then intimately admixed and used to impregnate the gamma-alumina particles in amounts, respectively, calculated to result in a final composite containing 0.2 wt. percent Ge, 0.3 wt. percent Sn and 0.375 wt. percent Pt. In order to insure uniform distribution of the metallic components throughout the carrier material, this impregnation step was performed by adding the carrier material particles to the impregnation mixture with constant agitation. In addition, the volume of the solution was about two times the volume of the carrier material particles. The impregnation mixture was maintained in contact with the carrier material particles for a period of about ½ hour at a temperature of about 70° F. Thereafter, the temperature of the impregnation mixture was raised to about 225° F. and the excess solution was evaporated in a period of about 1 hour. The resulting dried particles were then subjected to a calcination treatment in an air atmosphere at a temperature of about 925° F. for about 1 hour. The calcined spheres were then contacted with an air stream containing $H_2O$ and HCl in a mole ratio of about 40:1 for about 4 hours at 975° F. in order to adjust the halogen content of the catalyst particles to a value of about 0.90.

The resulting catalyst particles were analyzed and found to contain, on an elemental basis, about 0.375 wt. percent platinum, about 0.2 wt. percent germanium, about 0.3 wt. percent tin and about 0.85 wt. percent chloride.

Thereafter, the catalyst particles were subjected to a dry pre-reduction treatment by contacting them with a substantially pure hydrogen stream containing less than 20 vol. p.p.m. $H_2O$ at a temperature of about 1000° F., a pressure slightly above atmospheric and a flow rate of the hydrogen stream through the catalyst particles corresponding to a gas hourly space velocity of about 720 hr.$^{-1}$ This pre-reduction step was for a duration of about 1 hour.

Example II

In order to compare the novel catalytic composite of the present invention with those of the prior art in a manner calculated to bring out the interaction of the germanium component and the tin component with the platinum component, a comparison test was made between the catalyst of the present invention, which was prepared according to the method given in Example I, and a reforming catalyst of the prior art which contained platinum as its sole hydrogenation-dehydrogenation component. That is, the control catalyst was a combination of platinum and chlorine with a gamma-alumina carrier material which was prepared by a manner analogous to that given in Example I except for the inclusion of the germanium and tin components and contained, on an elemental basis, about 0.75 wt. percent platinum and about 0.85 wt. percent chlorine.

The catalysts were then separately subjected to a high stress evaluation test designed to determine their relative activity and selectivity for the reforming of a gasoline charge stock. In all tests, the same charge stock was utilized, its characteristics are given in Table I. It is to be noted that this test was conducted under a substantially water-free condition with the only significant source of water being the 5.9 wt. p.p.m. present in the charge stock.

TABLE I.—ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, p.p.m. | 5.9 |
| Octane number, F–1 clear | 40.0 |

This test was specifically designed to determined in a very short time period whether the catalyst being evaluated has superior characteristics for the reforming process. It consists of 6 periods comprising a 6 hour line-out period followed by a 10 hour test period run at a constant temperature during which time a $C_5+$ product reformate is collected. It was performed in a laboratory scale reforming plant comprising a reactor containing the catalyst, hydrogen separation zone, a debutanizer column, suitable heating, pumping and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction, and the excess over that needed for plant pressure is recovered as excess separator gas. Moreover, the liquid phase from the separating zone is withdrawn therefrom and passed to the debutanizer column wherein light ends are taken overhead as debutanizer gas and $C_5+$ reformate stream recovered as bottoms.

Conditions utilized in this test were: a constant temperature of about 963° F. for the first three periods followed by a constant temperature of about 997° F. for the last 3 periods, a liquid hourly space velocity of 3.0, an outlet pressure of the reactor of 100 p.s.i.g., and a mole ratio of hydrogen to hydrocarbon entering the reactor of 5.6:1 in the case of the catalyst of the present invention and 8:1 in the case of the control catalyst.

This 2 temperature test is designed to quickly and efficiently yield 2 points on the yield-octane curve for the particular catalysts. The conditions utilized are selected on the basis of experience to yield the maximum amount of information on the capability of the catalyst being tested to respond to a high severity operation.

The results of the separate tests performed on the catalyst of the present invention and the control catalyst are presented for each test period in Table II in terms of inlet temperature to the reactor in ° F., net excess separator gas in standard cubic feet per barrel of charge (s.c.f./bbl.), debutanizer overhead gas in standard cubic feet per barrel, the ratio of the debutanizer gas make to the total gas make, and F–1 clear octane number.

In addition, the respective catalysts were analyzed for carbon content after the completion of test. The results showed that the catalyst of the present invention contained 3.85 wt. percent carbon which was in marked contrast to the 5.05 wt. percent carbon which was found on the control catalyst. These results evidence an additional advantage of the present invention which is the capability to suppress the rate of deposition of carbonaceous materials thereon during the course of the reforming reaction.

TABLE II.—RESULTS OF ACCELERATED REFORMING TESTS

| Period No. | T °F. | Separator gas, s.c.f./bbl. | Debutanizer gas, s.c.f./bbl. | Debut. gas/total gas ratio | Octane No., F–1 clear |
|---|---|---|---|---|---|
| Catalyst of the present invention—0.375 wt. percent Pt 0.2 wt. percent Ge, 0.3 wt. percent Sn and 0.85 wt. percent Cl | | | | | |
| 1 | 963 | 1,553 | 76 | .046 | 97.5 |
| 2 | 963 | | 79 | | 97.2 |
| 3 | 963 | 1,520 | 56 | .036 | 96.5 |
| 4 | 997 | 1,688 | 65 | .037 | 99.4 |
| 5 | 997 | 1,653 | 67 | .039 | 98.9 |
| 6 | 997 | 1,588 | 68 | .041 | 98.1 |
| Control catalyst—0.75 wt. percent Pt and 0.85 wt. percent Cl | | | | | |
| 1 | 963 | 1,414 | 57 | .039 | 92.7 |
| 2 | 963 | 1,376 | 63 | .044 | 91.0 |
| 3 | 963 | 1,293 | 58 | .043 | 90.0 |
| 4 | 997 | 1,434 | 76 | .051 | 94.9 |
| 5 | 997 | 1,383 | 82 | .056 | 93.7 |
| 6 | 997 | 1,327 | 77 | .055 | 93.0 |

Referring now to the results of the separate tests performed in Table II, it is evident that the effect of the germanium and tin components on the catalyst is to substantially promote the platinum metal component and to enable a catalyst containing less platinum to out-perform a catalyst containing a substantially greater amount of platinum. That is, the catalyst of the present invention is sharply superior to the control catalyst in both activity and selectivity. As was pointed out hereinbefore, a good measure of activity for a reforming catalyst is octane number of reformate produced at the same conditions; on this basis, the catalyst of the present invention was materially more active than the control catalyst at both temperature conditions. However, activity is only half of the story: activity must be coupled with selectivity to demonstrate superiority. Selectivity is measured directly by reference to $C_5+$ yield and indirectly by reference to separator gas make, which is roughly proportional to net hydrogen make which, in turn, is a product of the preferred upgrading reactions and by reference to debutanizer gas make which is a rough measure of undesired hydrocracking and should be minimized for a highly selective catalyst. Referring again to the data presented in Table II and using the selectivity criteria, it is manifest that the catalyst of the present invention is materially more selective than the control catalyst.

From consideration of this data, it is clear that a combination of germanium and tin provides an efficient and effective promoter of a platinum metal reforming catalyst.

I claim as my invention:

1. A catalytic composite comprising a combination of a platinum group metal, a tin component and a germanium component with a porous carrier material, wherein substantially all of said platinum group metal is present as the elemental metal and substantially all of said germanium component is present in an oxidation state above that of the elemental metal, said catalytic composite containing, on an elemental basis about 0.01 to about 2 wt. percent of the platinum group metal, about 0.01 to about 5 wt. percent of tin and about 0.01 to about 5 wt. percent of germanium.

2. A catalytic composite comprising a combination of platinum, a tin component, a germanium component and a halogen component with an alumina carrier material, wherein substantially all of said platinum is present as the elemental metal and substantially all of said germanium component is present in an oxidation state above that of the elemental metal, said catalytic composite containing, on an elemental basis about 0.1 to about 3.5 wt. percent halogen, about 0.01 to about 2 wt. percent platinum, about 0.01 to about 5 wt. percent tin and about 0.01 to about 5 wt. percent germanium.

3. A catalytic composite as defined in claim 1 wherein said porous carrier material is a refractory inorganic oxide.

4. A catalytic composite as defined in claim 3 wherein said refractory inorganic oxide is alumina.

5. A catalytic composite as defined in claim 1 wherein said platinum group metal is platinum.

6. A catalytic composite comprising a combination of the catalytic composite defined in claim 1 with a halogen component.

7. A catalytic composite as defined in claim 6 wherein said halogen component is chlorine or a compound of chlorine.

8. A catalytic composite as defined in claim 1 wherein the atomic ratio of tin to platinum group metal contained in the composite is about 0.2:1 to about 3:1 and wherein the atomic ratio of germanium to platinum group metal contained in the composite is about 0.25:1 to about 6:1.

9. A catalytic composite as defined in claim 2 wherein said halogen component is chlorine or a compound of chlorine.

10. A catalytic composite comprising a combination of the catalytic composite defined in claim 2 with a sulfur component in an amount sufficient to incorporate about 0.05 to about 0.5 wt. percent sulfur, calculated on an elemental basis.

11. A catalytic composite as defined in claim 2 wherein the atomic ratio of tin to platinum contained in the composite is about 0.2:1 to about 3:1 and wherein the atomic ratio of germanium to platinum contained in the composite is about 0.25:1 to about 6:1.

12. A catalytic composite as defined in claim 2 wherein said composite contains about 0.05 to about 1 wt. percent platinum, about 0.1 to about 1 wt. percent tin, about 0.5 to 1.5 wt. percent halogen and about 0.05 to about 2 wt. percent germanium.

13. A process for converting a hydrocarbon which comprises contacting the hydrocarbon with the catalytic composite of claim 1 at hydrocarbon conversion conditions.

14. A process for reforming a gasoline fraction which comprises contacting the gasoline fraction in hydrogen with the catalytic composite of claim 2 at reforming conditions.

15. A process as defined in claim 14 wherein said reforming conditions include a temperature of about 800 to about 1100° F., a pressure of about 0 to about 1000 p.s.i.g., a liquid hourly space velocity of about .1 to about 10 hr.$^{-1}$ and a mole ratio of hydrogen to hydrocarbon of about 1 to 20 moles of hydrogen per mole of hydrocarbon.

16. A process as defined in claim 14 wherein pressure is about 50 to about 350 p.s.i.g.

17. A process as defined in claim 14 wherein said contacting is performed in a substantially water-free environment.

18. A process for reforming a gasoline fraction which comprises contacting the gasoline fraction and hydrogen with the catalytic composite of claim 12 at reforming conditions including a pressure of about 50 to about 350 p.s.i.g.

19. A process as defined in claim 18 wherein said process is performed in a substantially water-free environment.

References Cited

UNITED STATES PATENTS

| | | | |
|---|---|---|---|
| 2,861,959 | 11/1958 | Thorn et al. | 208—138 |
| 2,906,700 | 9/1959 | Stine et al. | 208—138 |
| 2,906,701 | 9/1959 | Stine et al. | 208—138 |
| 3,502,573 | 3/1970 | Pollitzer et al. | 208—138 |
| 3,511,888 | 5/1970 | Jenkins | 208—138 |

HERBERT LEVINE, Primary Examiner

U.S. Cl. X.R.

208—138; 252—466 PT